United States Patent
Ingvarsson et al.

(10) Patent No.: US 8,141,750 B2
(45) Date of Patent: Mar. 27, 2012

(54) STORAGE CONTAINER FOR GRANULAR FUEL, A DEVICE AND A METHOD FOR FEEDING THE FUEL FORWARD

(75) Inventors: Robert Ingvarsson, Amal (SE); Brian Larsson, Säffle (SE)

(73) Assignee: Janfire AB (SE)

( * ) Notice: Subject to any disclaimer, the term of this patent is extended or adjusted under 35 U.S.C. 154(b) by 1010 days.

(21) Appl. No.: 11/793,925

(22) PCT Filed: Dec. 23, 2005
(Under 37 CFR 1.47)

(86) PCT No.: PCT/SE2005/002047
§ 371 (c)(1),
(2), (4) Date: Apr. 21, 2008

(87) PCT Pub. No.: WO2006/068620
PCT Pub. Date: Jun. 29, 2006

(65) Prior Publication Data
US 2008/0277428 A1      Nov. 13, 2008

(30) Foreign Application Priority Data
Dec. 23, 2004   (SE) ...................................... 0403167

(51) Int. Cl.
*A45D 24/22* (2006.01)

(52) U.S. Cl. ...................... 222/203; 222/413; 222/386.5

(58) Field of Classification Search .................. 222/413, 222/386.5, 105, 389, 200–203
See application file for complete search history.

(56) References Cited

U.S. PATENT DOCUMENTS

| | | | |
|---|---|---|---|
| 1,570,795 A * | 1/1926 | Tainton | 222/1 |
| 3,275,197 A | 9/1966 | Ekulnd | |
| 3,941,258 A | 3/1976 | Ide | |
| RE32,232 E | 8/1986 | Bonerb et al. | |
| 4,673,112 A | 6/1987 | Bonerb | |
| 4,728,004 A | 3/1988 | Bonerb | |
| 5,335,820 A * | 8/1994 | Christianson | 222/105 |

FOREIGN PATENT DOCUMENTS

| | | |
|---|---|---|
| DE | 3701582 | 7/1988 |
| DE | 19824882 A1 | 12/1999 |
| EP | 1101712 A1 | 5/2001 |
| SE | 525448 | 10/2006 |

OTHER PUBLICATIONS

Supplementary European Search Report for Application No. EP 05 82 0988, 5 pp., dated Jul. 20, 2009.

* cited by examiner

*Primary Examiner* — Kevin P Shaver
*Assistant Examiner* — Melvin Cartagena
(74) *Attorney, Agent, or Firm* — Eric L. Sophir; SNR Denton US LLP

(57) ABSTRACT

A storage container for granular fuel, comprising a lower, essentially horizontal, limiting surface and at least one adjoining lateral limiting surface, a feeding out device with an axial extension that considerably exceeds its radial extension, the feeding out device being arranged along at least 50%, preferably at least 75%, and even more preferred at least 90% of the axial extension of said lower limiting surface, a forward-feeding device arranged to transport said fuel in a direction towards said feeding out device, comprising a flexible bag that via a pressurized air inlet is inflatable and that is arranged in connection with at least a portion of the storage container's lower limiting surface and its adjoining lateral limiting surface, the feeding out device being arranged inside said storage container and the bag also comprising at least one outlet for pressurized air, whereby a flow of pressurized air is allowed through the bag during the inflation thereof.

19 Claims, 3 Drawing Sheets

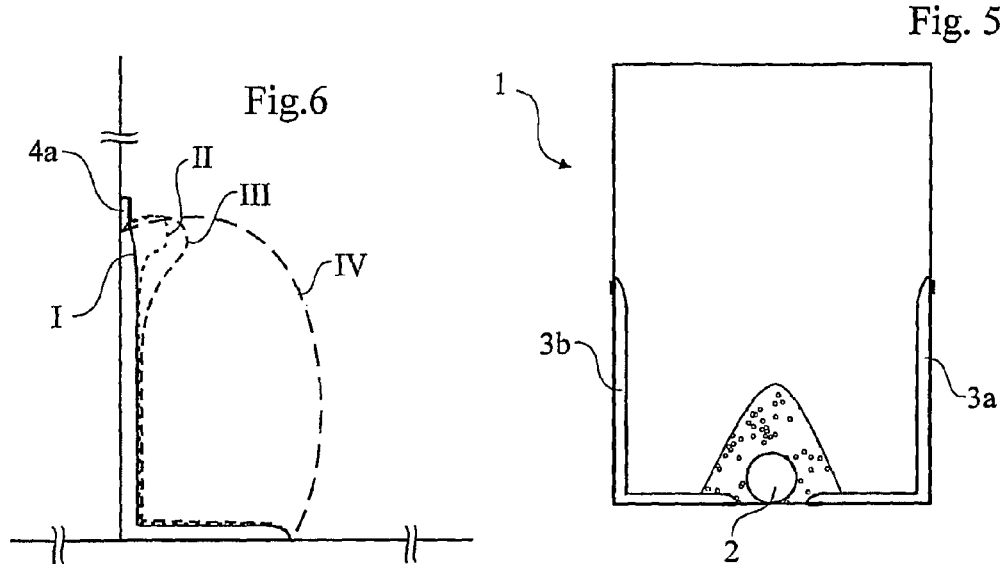
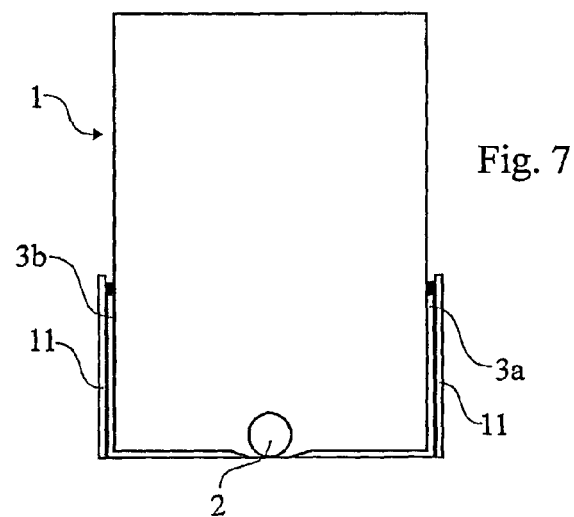
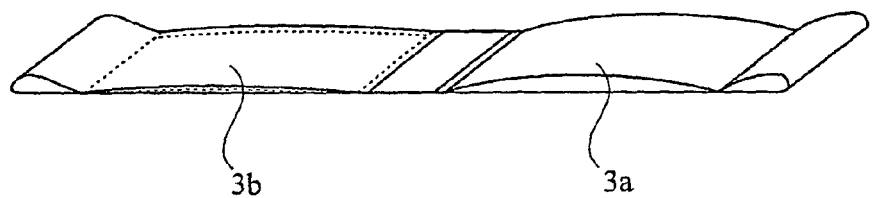

STORAGE CONTAINER FOR GRANULAR FUEL, A DEVICE AND A METHOD FOR FEEDING THE FUEL FORWARD

TECHNICAL FIELD

The present invention relates to a stationary storage container for granular fuel, comprising a lower, essentially horizontal, limiting surface and at least one adjoining lateral limiting surface, a feeding out device with an axial extension that considerably exceeds its radial extension, the feeding out device being arranged along at least 50%, preferably at least 75%, and even more preferred at least 90% of the axial extension of said lower limiting surface, a forward-feeding device arranged to transport said fuel in a direction towards said feeding out device, comprising a flexible bag that via a pressurised air inlet is inflatable and that is arranged in connection with at least a portion of the storage container's lower limiting surface and its adjoining lateral limiting surface.

PRIOR ART

For several reasons it is desirable as complete as possible to be able to empty a storage container for granular fuel, such as wooden pellets.

Previously, the applicant has developed a container designed with a flexible wall and bottom and with an inner system of pull ropes that will mechanically empty the container of material remaining due to its angle of repose. Such a container is known from SE 0201252-4.

Another device for facilitating the emptying of material remaining in a container is known from EP 1101712. This device, intended to be used in tiltable transport containers, comprises inflatable bags positioned in the lower corners of the end of the container in which the outlet is positioned. The bags, having a triangular or trapezoidal shape, are mounted outside a liner of flexible material, which is positioned inside the container. By inflating the bags, the material that otherwise would be left in the corners is fed forward to the outlet during the final stage of emptying.

U.S. Pat. No. 3,275,197 discloses a device for increasing the degree of emptying of a stationary container. The emptying takes place by a suction lance and the object of the device is to fluidise the material in order to facilitate emptying. With the purpose of feeding forward material that otherwise might be left along the outer edges of the container, the container is provided with an inflatable device to lift up the material from the bottom of the container, and thereby to increase the angle of repose in a direction towards the mouth of the suction lance. By the device comprising a permeable membrane and by being positioned inside the container, the material can be fluidised.

THE OBJECT OF THE INVENTION

It is an object of the present invention to provide a storage container for granular fuel (such as wooden pellets), enabling essentially complete emptying of a stationary storage container for granular fuel, comprising a lower, essentially horizontal, limiting surface and at least one adjoining lateral limiting surface, a feeding out device with an axial extension that considerably exceeds its radial extension, the feeding out device being arranged along at least 50%, preferably at least 75%, and even more preferred at least 90% of the axial extension of said lower limiting surface, a forward-feeding device arranged to transport said fuel in a direction towards said feeding out device, comprising a flexible bag that via a pressurised air inlet is inflatable and that is arranged in connection with at least a portion of the storage container's lower limiting surface and its adjoining lateral limiting surface, the feeding out device being arranged inside said storage container and the bag also comprising at least one outlet for pressurised air, whereby a flow of pressurised air is allowed through the bag during the inflation thereof.

It is yet another object of the invention to be able to provide a device that allows for essentially complete emptying of a storage container, and that can be used in combination with existing storage containers of various types, without requiring extensive reconstruction of the storage container.

According to yet another object of the invention, a device is provided that does not require any manual operation or supervision during operation.

It is also an object to provide a device that is operated in such manner that it will have a long lifetime, and for which maintenance and repair is minimised.

BRIEF DESCRIPTION OF THE DRAWINGS

FIG. 5 shows a cross-section of the invention in an emptying position,

FIG. 6 shows four positions of feeding forward, and

FIG. 7 shows a cross-section of the invention in a preferred embodiment, and

FIG. 8 schematically shows a feeding-forward device.

DETAILED DESCRIPTION OF THE INVENTION

Figure 1:
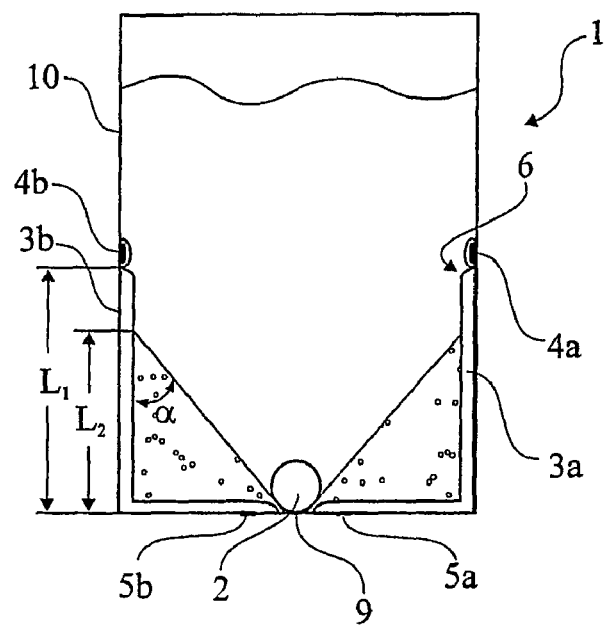
FIG. 1 shows a section of two devices according to the invention, mounted in a storage container.

FIG. 1 shows a cross-section of two inventive devices in the form of inflatable bags 3a, 3b, mounted inside a storage container 1. The storage container, in this embodiment suitably a tank 1 or some other room with fixed limiting surfaces, comprises a feeding out device 2 positioned in connection with the bottom surface 9 of the container. In this embodiment, the feeding out device, which may be a conventional feeding out screw, is positioned symmetrically along the centre line of the bottom surface, but it is also conceivable according to the invention to have a feeding out screw that is positioned non-symmetrically, e.g. along a lateral surface of the container. In such an alternative embodiment, it is conceivable to use a single inflatable bag along the opposite lateral surface of the container.

Figure 4:
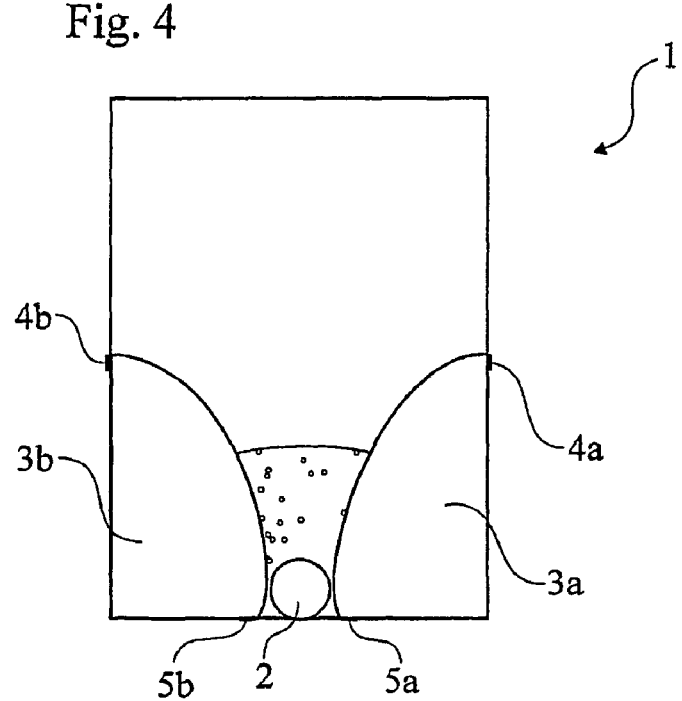
FIG. 4 shows a cross-section of the invention in an inflated position.

Two feeding-forward devices according to the invention, in the form of inflatable bags 3a, 3b of a flexible material, are arranged on either side of the feeding-forward device 2, by the aid of which bags a more complete emptying of the storage container 1 can be achieved. The emptying process is described in connection with FIG. 5. The bags are suitably mounted along the wall 10 and bottom 9 of the container, which is indicated at 4a, 4b and 5a, 5b, respectively. In FIGS. 1, 4 and 5, the shape of the bags in a decompressed condition has been exaggerated in order to illustrate their positioning. In practice, the material in the container will press the bags towards the limiting surface/surfaces that surround(s) the respective bag.

When the container is emptied of pellets, some material will remain on either side of the feeding out device, as caused by the angle of repose a of the material. According to a preferred embodiment, a feeding-forward device according to the invention is therefore arranged such that its upper edge 6 is at a level $L_1$ that is at least at the same height as the remaining material $L_2$. Preferably, the upper edge 6 is arranged at a level above the remaining material. It is realised that the positioning of the level $L_1$, at which the upper edge of the feeding-forward device is positioned, depends on the distance from the container's wall to the feeding out device.

Figure 2:
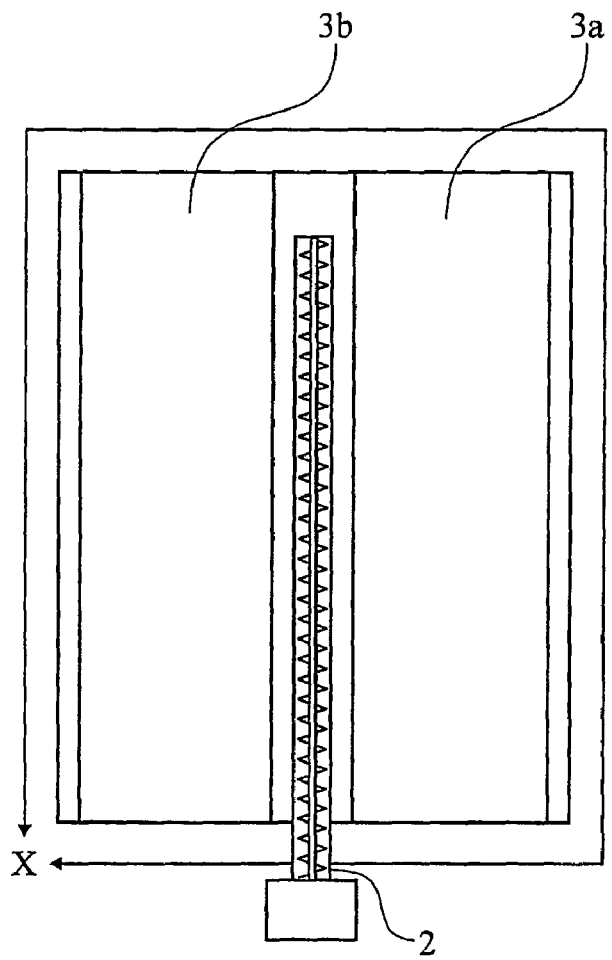
FIG. 2 shows a container as seen from above.

FIG. 2 shows the storage container in a view from above. In a preferred embodiment, the bag 3a, 3b has an axial extension that essentially corresponds to the axial extension of the feeding out device 2. According to the concept of the invention, no forward feeding of the material is required from the short sides of the container, i.e. the limiting surfaces having an extension essentially perpendicular to the axial extension of the feeding out screw, which means that it is adequate to arrange the bag such that its main axial extension is in essential parallel with the axial extension of the feeding out screw. The axial extension of the bag, or the total axial extension of a plurality of bags, is not more than 90%, preferably 30-80%, of the total circumferential extension x of the lateral limiting surfaces of the storage container.

Figure 3:
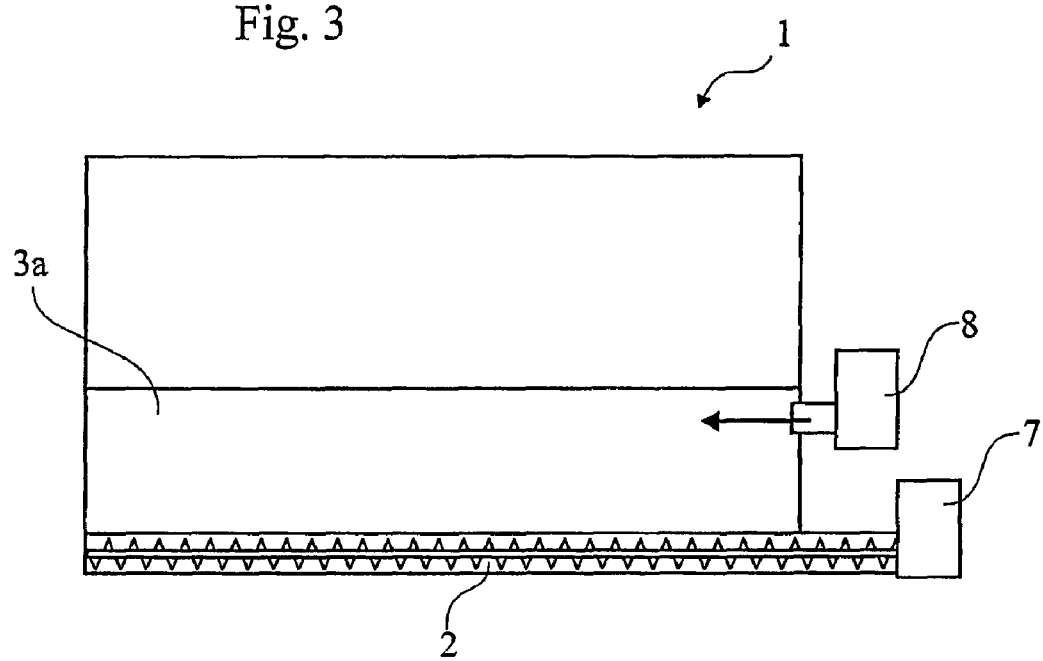
FIG. 3 shows a longitudinal section of a container.

FIG. 3 shows a container in longitudinal section. It shows the feeding-forward device 3 a mounted inside the container 1, and the feeding out device 2 with its drive unit 7. A pressurising device 8, most simply in the form of a fan, is arranged to supply air to the feeding-forward device, preferably to its upper part. It is realised that the fan could be positioned at some other location than in direct connection with the container, whereby the air could be supplied to the feeding-forward device via a hose (not shown).

In a preferred embodiment, the feeding-forward device has the shape of a rectangular bag, and comprises an inner side that faces the feeding out device and an opposite, outer side. Preferably, the bag is made of a material that allows for the sides of the bag to be sewn together, giving the advantage that the seams will function as an outlet for pressurised air, as they allow for some through-flow of air. This prevents the bag from bursting of the pressure in the bag for some reason gets to high. This embodiment also means that no other devices are needed for pressure relief of the bag.

According to a preferred embodiment, the bag is made of an airtight material, suitably a plastic-coated fabric. In its simplest embodiment, the bag consists of two rectangular parts of airtight plastic fabric, which are joined together in the sides. The bag can also consist of a single double-folded piece, and suitably a channel is sewn in the folded end, for easy mounting of the bag inside the container. It is also conceivable to sew a forward-feeding device with two bags from a single continuous piece of fabric, which is most easily done by folding the piece of fabric from both short sides and sewing it together, as is shown in FIG. 8. Suitably, a piece of single material is left on either sides of the centre line, such that inflation does not take place immediately below the feeding out device. Suitably, the double-folded ends are provided with channels for easy suspension of the bag inside the storage container, according to the description above.

By the joints acting as an exhaust for the pressurised air, a safety function is achieved that gives an advantage in connection with the filling of pellets in the container. Given that the inflation of the bag takes place automatically, it may happen that the bag is in the inflated condition at the same time as the container is being filled with pellets. In connection with the filling of pellets, it will exert a pressure on the bag, as the level of pellets rises in the container. By the seam allowing for an exhaust of pressurised air, the air inside the bag can be evacuated. Furthermore, the fan is arranged to operate at a comparably moderate working pressure, which means that even if the pressure inside the bag gets to high, the bag can be emptied of air also via the fan.

According to the concept of the invention, the fan operates for a predetermined, fixed time period adapted for complete filling of the bag. The air leakage allowed in the seams results in enabling of a requisite air flow through the fan, and overheating thereof can be avoided in case only a limited inflation of the bag is possible (se FIG. 6 and the description corresponding thereto). The person skilled in the art will realise that other ways can be used to make the joints of the bag. For example, the sides can be welded or glued together in case the bag is made of a material suitable therefore. Suitably, some type of exhaust is arranged for along some part of the joints. The person skilled in the art realises that the bag can be provided also with other types of exhausts, within the scope of the invention.

FIG. 4 shows a container with the inflatable bags in a fully inflated condition. By the bags 3a, 3b being accommodated inside a container with fixed limiting surfaces, the expansion will take place in a direction towards the centre of the container, whereby the remaining material can be efficiently fed forwards to the feeding out device.

In FIG. 5, the inflatable bags 3a, 3b have returned to a decompressed condition, and the remaining material forms a pile around the feeding out device 2.

The process of feeding forward by aid of a device according to the invention will now be described with reference to FIG. 6. The drawing indicates four different positions I-IV, where position I is the unaffected position of the bag. As the amount of material decreases in the container the position shown in FIG. 1 is assumed, i.e. that the feeding out device runs idle due to the formation of an angle of repose, which means that the remaining amount of pellets will not be able on its own to fall down to the transport device. At a given signal from the feeding out device, the fan 8 is activated and air is blown into the bag. It is realised that since the remaining material exerts a pressure on the bag, which increases in proportion to the depth of the pile of material, the expansion of the bag will take place where the pressure is the least, i.e. initially in the upper part of the bag. Testing has shown that an air pressure of 0.1 bar is adequate for the device to work properly. Of course, modifications are possible within the scope of the invention, and conceivably the fan could be operated at a higher or a lower pressure. According to the concept of the invention, the fan operates at a relatively moderate pressure, of 0.5 bar at the most, preferably about 0.1 bar.

At full pressure, the bag is able to press away some of the material. Thereby, the material at the top of the pile will be displaced towards the centre of the container, whereby fuel falls down towards the feeding out device, which is indicated in the drawing as position II.

According to the concept of the invention, the fan is activated for a predetermined time period, independent of the amount of material that remains in the container. By the bag allowing for some through-flow of air in the seams (see above), no control equipment is required to switch off the fan when the bag has pushed away the amount of pellets that it is able to at the point of time in question, which means that the cost of the system can be kept down. Allowing for a certain through-flow of air in the seams eliminates the risk of the bag bursting as the fan continues to operate. Moreover, the advantage is attained that a certain air flow is maintained through the fan, which decreases the risk of overheating. When the fan is shut off, the bag will be decompressed and return to position I. This method of operation will also increase the life of the fan.

In position III that is assumed in a later stage when the feeding out device once again runs idle due to the pellets fed forward in position II being finished, the bag is pressurised whereby an additional amount of pellets can be pushed out from the wall. The procedure is repeated a required number of times, and finally the position indicated at IV is assumed, i.e. in which all the pellets has been fed forward to the feeding out device.

It is realised that depending on the size of the container, this process of pressurisation and decompression will be repeated different numbers of time. Furthermore, the air pressure affects the number of inflation cycles. It is realised that for a container that is filled in average 2-3 times a year, which is normal for containers in private houses, the number of inflations will be low. Therefore, the life of the fan will be long, despite the fact that a fan of simple type can be used.

With the purpose of full automatization of the plant, the control unit of the feeding-forward device and the transport device may be provided with an alarm, in order to indicate that the amount of pellets in the container is nearly finished. Normally, there is a collecting box for pellets fed forward, in connection with the feeding out device. The collecting box holds pellets for a short time of combustion and from the box the pellets is transported to the combustion device, when the combustion device calls for fuel. Some type of detector, a dielectric detector e.g., is positioned in this collecting box, which detector registers, when the transport device is activated, if pellets is fed forward to the collecting box within a given prescribed time period, such as about 30 sec (suitably with some safety margin, such as 10 sec if it normally takes about 20 sec to fill the collecting box with pellets). If an angle of repose has formed, such that no pellets can be fed forward by caving, there being no pellets on top of the feeding out device, a signal is given for inflation of the feeding-forward device, according to the method described above. It has been chosen to dimension the feeding-out such that after the container has been emptied (without activation of the bag(s)), i.e. the case when the angle of repose has formed such that pellets remains only in the corners and along the sides, a certain number, about four times, of activations is required of the inflatable bags in order to empty the container completely. In a storage container similar to the one known from the applicant's patent application SE 0201252-4, which container is provided in various sizes for use in single-family houses, the remains is about 1 cubic metre if the storage container has a size of 1.5×2.0×2.0 m (width×length×height), meaning that the boiler in the normal case will get fuel for yet another 3-4 weeks. Each inflation enables operation of the boiler for another 5-7 days.

The storage container according to the invention, with automated function, is equipped with yet another arrangement that gives an automated filling alarm to a pellets supplier, and is also equipped with other service functions. In a preferred embodiment, the function is based on a GSM-transmitter being connected to the control unit, which is programmed to give a signal or to send an SMS to both the supplier and to the boiler operator/owner (or to be connected to a computer for ordering via e-mail or some other suitable communication device). According to a preferred embodiment, this is used such that the GSM-transmitter receives a signal to send an ordering SMS after a certain number of inflations, e.g. after the second inflation. Thereby, a signal is sent to a pellets supplier, but simultaneously also to the boiler owner, such that any possible incorrect order can be withdrawn. Thus, the control unit according to the preferred system is provided with a memory unit/counter mechanism that registers the number of inflations, in order to, in connection with for example the second inflation, transmit a signal to the control unit, indicating that the pellets will soon be finished. Accordingly, this signal may activate a GSM-transmitter, or be connected to a computer that sends a pellets order to a predetermined pellets supplier, which means that automated pellets ordering can be achieved. Suitably, a copy of the order is sent to the owner of the storage container. In this way, the boiler owner never needs to control the level himself, but instead automated pellets filling takes place.

Another detector can be positioned in the storage container, which detector indicates that a pellets filling has taken place, and this detector can be arranged to signal the counter mechanism to reset the counter mechanism for inflations. Also, a signal can be given that activates the GSM transmitter that sends a message to the owner that a pellets filling has taken place. Of course, the detector could be replaced instead by a delivery note from the pellets supplier, sent by Internet or a GSM transmitter to the control unit, in order thereby to announce that a pellets filling has taken place, whereby the counter mechanism is reset.

The system may also be provided with an additional function that serves to give an alarm if no pellets are fed to the collecting box despite activation of the bag inflation, indicating that some part of the feeding forward may be broken. This function can be achieved to initiation of yet another limited timing, such as about 2 min, in connection with the activation of the fan, with the purpose of registering if no pellets are fed forward to the collecting box. Accordingly, a control function is achieved for registering if inflation of the feeding-forward device results in pellets being fed forward to the feeding out device and further to the collecting box. If, despite the activation of the feeding-forward device, pellets is not fed forward to the collecting box, i.e. the detector indicates no pellets in the box within the prescribed time period, an alarm is activated and the system is shut down. This alarm can indicate that the fan may be broken, whereby no inflation of the feeding-forward device can take place, or alternatively that the screw may be broken or that some other breakdown has occurred, and also that the pellets may be completely finished (if delivery has not been made in time). By this safety function, repeated inflation of the bag can be avoided, as well as long time operation of the feeding out device that could result in overheating of shafts, motors, etc., that could constitute a fire hazard.

FIG. 7 shows a preferred embodiment of the invention. Here, a feeding-forward device according to the invention is used together with a container having limiting surfaces of a flexible material, similar to the one known from the applicants patent application SE 0201252-4. In this application, the feeding-forward device is suitably mounted outside the container, but it should be understood that internal mounting is practical also. Also, an integrated embodiment is conceivable.

Such a container could be mounted in a stand (not shown) or be otherwise supported. With the purpose of counteracting an expansion in the opposite direction in connection with the inflation of the feeding-forward device, i.e. in a direction away from the centre of the container, a holder-on, most simply in the form of a rim or ribs, could be arranged in connection with the outside of the bag. Furthermore, it is an advantage if the bag is fixed in the stand, or is coupled with the container, as this allows for a more controlled movement during inflation. Also, it may be beneficial to connect the lower corners of the container with the short side of the bag. As an alternative, the short sides of the bag are provided with clamps or pieces or rope, in order when the bag is mounted to interconnect the horizontal and the vertical sides of a short side of the bag, whereby the corners are enclosed. This allows for a more efficient emptying of material in the corners.

It is particularly advantageous to mount the bag such that its outer side is essentially stretched out about the circumference of the container, as viewing the container in cross-section. This is particularly the case when a feeding-forward device according to the invention is used for outside mounting on a container with flexible limiting surfaces. In a simple embodiment, this is achieved by integrating two bags as a continuous unit and mounting them in a stretched out position. It is advantageous if no inflation is allowed in the section below the feeding out device. Furthermore, the bag tends to exert a lifting force on the bottom of the container, which means that is may be beneficial to fix the feeding out device vertically, in some suitable manner.

In order to avoid damaging of the ground, the feeding out device should suitably be mounted inside the storage container, most simply resting on the bottom of the storage container. If the storage container is made of a flexible material according to that described in connection with FIG. 7, the container is suitably mounted such that its bottom rests on the ground and the feeding out device is positioned inside the container, resting on the ground. Thereby, the storage container will not be exposed to loads from the pellets, which allows for a simple design. It is realised that by aid of a feeding-forward device according to the invention, this simple embodiment of the storage container having an internal feeding-forward device, can be allowed without requiring other means for emptying the container, such as a sloping bottom.

The invention is not limited to that described above but may be varied within the scope of the claims. It is realised for example that the bag can be provided with gables, in order to allow for an even better degree of emptying. It is realised that the bag can be provided with a plurality of sections, which is within the scope of the invention.

The invention is neither limited to the use of a feeding out screw, but other elongated feeding out devices can be used, such as transporting chains or scraping devices. If the feeding out device is asymmetrically positioned, bags of different shapes can be used or alternatively only a single bag. For example, the feeding out screw could be positioned along a side surface of the storage container, and in such an embodiment it is adequate to arrange a single bag along the opposite side surface of the storage container.

It is also conceivable to use a bag according to the invention in a storage container the lateral limiting surfaces of which are not straight, such as a storage silo. Here, a so called flexible feeding out screw can be used, which is arranged to run at a fixed distance from the curved limiting surface. The person skilled in the art will realise that in such an application, the use of one or more inflatable bags is also comprised in the scope of the invention. As before, the bag(s) is/are arranged with an extension that is essentially parallel with the axial extension of the feeding out screw. In case a flexible feeding out screw is used, which is arranged in a curved path along a curved limiting surface, it is understood that the essential longitudinal extension of a bag is essentially parallel with a median line of the feeding out screw's axial extension.

A bag that is not vertically fixed is also comprised in the scope of the invention. It is conceivable to let the bag run along grooves or rails, or to use telescopic positioning devices, whereby the positioning is controlled by the upper level of material in the storage container. In particular in connection with an application outside a flexible storage container, this should be practical.

It is also possible to have a storage container embedded in the ground. Just as for septic tanks, it is an advantage if the container is given a shape that prevents it from being pushed up by the external ground pressure if the ground is saturated with moist. For example, the lower part of the container could have a larger width than the upper part.

The container could be shaped as a horizontal cylindrical tank, or the lower part of the container could be provided with flanges that keep the tank in place when soil is filled around the container. A manhole is located in connection with one side of the container, where the motor of the feeding out device and the fan etc. are situated. The transport of pellets from the feeding out device can take place below ground, to the house in which the combustion device is located.

The invention claimed is:

1. A storage container for granular fuel, comprising a lower, essentially horizontal, limiting surface and at least one adjoining lateral limiting surface, a feeding out device with an axial extension that considerably exceeds its radial extension, the feeding out device being arranged along at least 50% of the axial extension of said lower limiting surface, a forward-feeding device arranged to transport said fuel in a direction towards said feeding out device, comprising a flexible bag that via a pressurized air inlet is inflatable and that is arranged in connection with at least a portion of the storage container's lower limiting surface and its adjoining lateral limiting surface, wherein the feeding out device is arranged inside said storage container and that the bag also comprises at least one outlet for pressurized air, whereby the outlet is formed by a seam where parts of the bag have been sewn together, and a flow of pressurized air is allowed out of the bag during the inflation thereof.

2. A storage container according to claim 1, wherein the bag has an axial extension that essentially corresponds to the axial extension of the feeding out device, and that the essential axial extension of the bag is essentially parallel with the axial extension of the feeding out device.

3. A storage container according to claim 2, wherein the axial extension of the bag is not more than 90% of a total circumferential extension of the storage container's lateral limiting surfaces.

4. A storage container according to claim 3, wherein an upper edge of the bag is arranged at a level at the container's lateral limiting surface, which level is at least at the same level as the height of the material remaining adjacent said limiting surface, due to the angle of repose of the material.

5. A storage container according to claim 3, wherein an upper edge of the bag is arranged at a level at the container's lateral limiting surface, which level is at a level above the height of the material remaining adjacent said limiting surface, due to the angle of repose of the material.

6. A storage container according to claim 3, wherein a lower edge of the bag is arranged in connection with the feeding out device.

7. A storage container according to claim 3, wherein the axial extension of the bag is 30-80% of a total circumferential extension of the storage container's lateral limiting surfaces.

8. A storage container according to claim 1, wherein the bag is rectangular and comprises an inner side facing the feeding out device, and an opposite, outer side.

9. A storage container according to claim 8, wherein the bag comprises two gables.

10. A storage container according to claim 8, wherein the parts of the bag have been at least partly joined together by sewing, forming a seam, whereby the seam at least partly forms said outlet for pressurised air.

11. A storage container according to claim 8, wherein the parts of the bag have been joined together by welding and/or gluing, forming a joint, whereby said outlet is arranged along some portion of the joint.

12. A storage container according to claim 1, wherein the container is stationary.

13. A storage container according to claim 1, wherein the feeding out device is arranged along at least 75% of the axial extension of the lower limiting surface.

14. A storage container according to claim 13, wherein the feeding out device is arranged along at least 90% of the axial extension of the lower limiting surface.

15. A feeding-forward device comprising:
   an inflatable, flexible bag which bag comprises an inner side, an opposite, outer side, and an inlet for pressurized air, wherein the bag also comprises at least one outlet for pressurized air, whereby the outlet is formed by a seam where parts of the bag have been sewn together, and which allows for a flow of pressurized air out of the bag during inflation;
   wherein the feeding-forward device is arranged to feed forward granular fuel in a storage container, the storage container comprising a lower, essentially horizontal, limiting surface and at least one adjoining lateral limiting surface, a feeding out device with an axial extension that considerably exceeds its radial extension, the feeding out device being arranged along at least 50% of the axial extension of said lower limiting surface.

16. A feeding-forward device according to claim 15, wherein the bag comprises sides that have been joined together, forming a joint, whereby said outlet is arranged along some portion of the joint.

17. A forward-feeding device according to claim 16, wherein the sides of the bag at least partly have been joined together by sewing.

18. A forward-feeding device according to claim 16, wherein the sides of the bag have been joined together by welding and/or gluing.

19. A method of feeding forward a granular fuel, comprising the steps of:
   a) providing a feeding-forward device, the feeding-forward device comprising an inflatable, flexible bag which bag comprises an inner side, an opposite, outer side, and an inlet for pressurized air, wherein the bag also comprises at least one outlet for pressurized air, whereby the outlet is formed by a seam where parts of the bag have been sewn together, and which allows for a flow of pressurized air out of the bag during inflation;
   b) providing a storage container for granular fuel, the storage container comprising a lower, essentially horizontal, limiting surface and at least one adjoining lateral limiting surface, and a feeding out device with an axial extension that considerably exceeds its radial extension, the feeding out device being arranged along at least 50% of the axial extension of said lower limiting surface; wherein the feeding-forward device is arranged to transport the granular fuel towards the feeding out device,
   c) detecting a shortage of fuel,
   d) activating a supplying device for supply of pressurized air to the flexible bag,
   e) inflation of the flexible bag, whereby granular fuel is brought to cave down towards the feeding out device,
   f) deactivation of the supplying device, after a predetermined time period,
   g) evacuation of air from the flexible bag, wherein the evacuation of air from the flexible bag takes place via an outlet in the bag, also allowing for a certain flow of pressurized air out of the bag during the inflation.

* * * * *